US011973765B2

(12) United States Patent
Muscariello et al.

(10) Patent No.: US 11,973,765 B2
(45) Date of Patent: Apr. 30, 2024

(54) GROUP ACCESS CONTROL

(71) Applicant: Cisco Technology, Inc., San Jose, CA (US)

(72) Inventors: Luca Muscariello, Paris (FR); Giulio Grassi, Paris (FR); Jacques Samain, Paris (FR); Olivier Roques, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 17/314,950

(22) Filed: May 7, 2021

(65) Prior Publication Data

US 2022/0360589 A1 Nov. 10, 2022

(51) Int. Cl.
*H04L 9/40* (2022.01)
*H04L 9/08* (2006.01)

(52) U.S. Cl.
CPC .......... *H04L 63/104* (2013.01); *H04L 9/0819* (2013.01); *H04L 9/0861* (2013.01); *H04L 9/0891* (2013.01); *H04L 63/0435* (2013.01); *H04L 63/068* (2013.01)

(58) Field of Classification Search
CPC ... H04L 63/104; H04L 9/0819; H04L 9/0861; H04L 9/0891; H04L 63/0435; H04L 63/068; H04L 9/0836; H04L 63/062; H04L 63/065; H04L 9/0844
See application file for complete search history.

(56) References Cited

U.S. PATENT DOCUMENTS 6,240,188 B1 5/2001 Dondeti et al.
6,901,510 B1 5/2005 Srivastava 2012/0257756 A1 10/2012 Huang et al.
2013/0046983 A1 2/2013 Zhu et al.
2015/0195261 A1 7/2015 Gehrmann et al.
2015/0312953 A1* 10/2015 Wang .................... H04L 1/1854
  370/312
2018/0239536 A1* 8/2018 Koppolu ............. G06F 11/2094
(Continued)

OTHER PUBLICATIONS

"Tree-Based Group Key Agreement" Feb. 1, 2004, Kim et al. (https://doi.org/10.1145/984334.984337) (Year: 2004).*
(Continued)

*Primary Examiner* — Shin-Hon (Eric) Chen
*Assistant Examiner* — Brian William Avery
(74) *Attorney, Agent, or Firm* — Lee & Hayes P.C.

(57) ABSTRACT

This disclosure describes techniques for controlling group access to a collaboration technology. The techniques include generating a shared encryption key among authorized producers of content associated with a collaboration technology. The techniques include receiving, by the authorized producers and from authenticated consumers, requests to access the content. The requests may be received in a partitioned manner, such that individual producers are serving a particular subset of the authenticated consumers. In response to receiving the requests, the techniques include sending the shared encryption key from the individual producers to the corresponding subset of authenticated consumers. The techniques include using the shared encryption key to encrypt content by the authorized producers, which may then be decrypted by the authenticated consumers using the shared encryption key, achieving end-to-end encryption of event content.

20 Claims, 6 Drawing Sheets

(56) References Cited

U.S. PATENT DOCUMENTS

2020/0100115 A1* 3/2020 Skaaksrud .............. H04L 41/06
2022/0206958 A1* 6/2022 LeMay ............... G06F 12/0831
2022/0256343 A1* 8/2022 Newman ........... H04W 12/0433

OTHER PUBLICATIONS

Flexible Group Key Exchange with On-demand Computation of Subgroup Keys Michel Abdalla et al. (Year: 2010).*

A. Fiat and M. Naor. Broadcast encryption. In Proc. of Crypto 1993, vol. 773 of LNCS, pp. 480-491. Springer-Verlag, 1993.

Barnes, Richard, et al. "The Messaging Layer Security (MLS) Protocol." Working Draft, IETF Secretariat, Internet-Draft draft-ietf-mls-protocol-07 (2019).

Carofiglio, G., Muscariello, L., Auge, J., Papalini, M., Sardara, M., & Compagno, A. (Sep. 2019). Enabling ICN in the internet protocol: analysis and evaluation of the hybrid-ICN architecture. In Proceedings of the 6th ACM Conference on Information-Centric Networking (pp. 55-66).

Katriel Cohn-Gordon, Cas Cremers, Luke Garratt, Jon Millican, and Kevin Milner. On ends-to-ends encryption: Asynchronous group messaging with strong security guarantees. Cryptology ePrint Archive, Report 2017/666, 2017.

Kim, Yongdae, Adrian Perrig, and Gene Tsudik. "Tree-based group key agreement." ACM Transactions on Information and System Security (TISSEC) 7.1 (2004): 60-96.

Muscariello, L., Carofiglio, G., Auge, J., & Papalini, M. (2018). Hybrid information-centric networking. Internet Engineering Task Force, Internet-Draft draft-muscariellointarea-hicn-00.

* cited by examiner

GROUP ACCESS CONTROL

TECHNICAL FIELD

The present disclosure relates generally to controlling group access to a collaboration technology, including control of encryption of content provided through the collaboration technology, thereby improving network security.

BACKGROUND

A collaboration technology may provide content, such as audio, video, and/or messaging communications, between users. The users may be producers and/or consumers of the content, or both. For example, a videoconferencing application may allow user to speak to one another, view one another, or chat with other users during an event. Security for collaboration technology may be arranged depending on an underlying transport technology used by the collaboration technology. For instance, group key agreement (GKA) may provide end-to-end encryption among small groups of users. An extension such as messaging layer security (MLS) may also allow end-to-end encryption for dynamic groups where some members may come online at any time. In contrast, broadcast encryption (BE) may provide security for an event with a very large number of consumers. However, due to the significant differences between GKA and BE and the underlying transport technologies they are meant to serve, scaling an event or otherwise handling an event of unknown size, from small to very large, may be problematic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
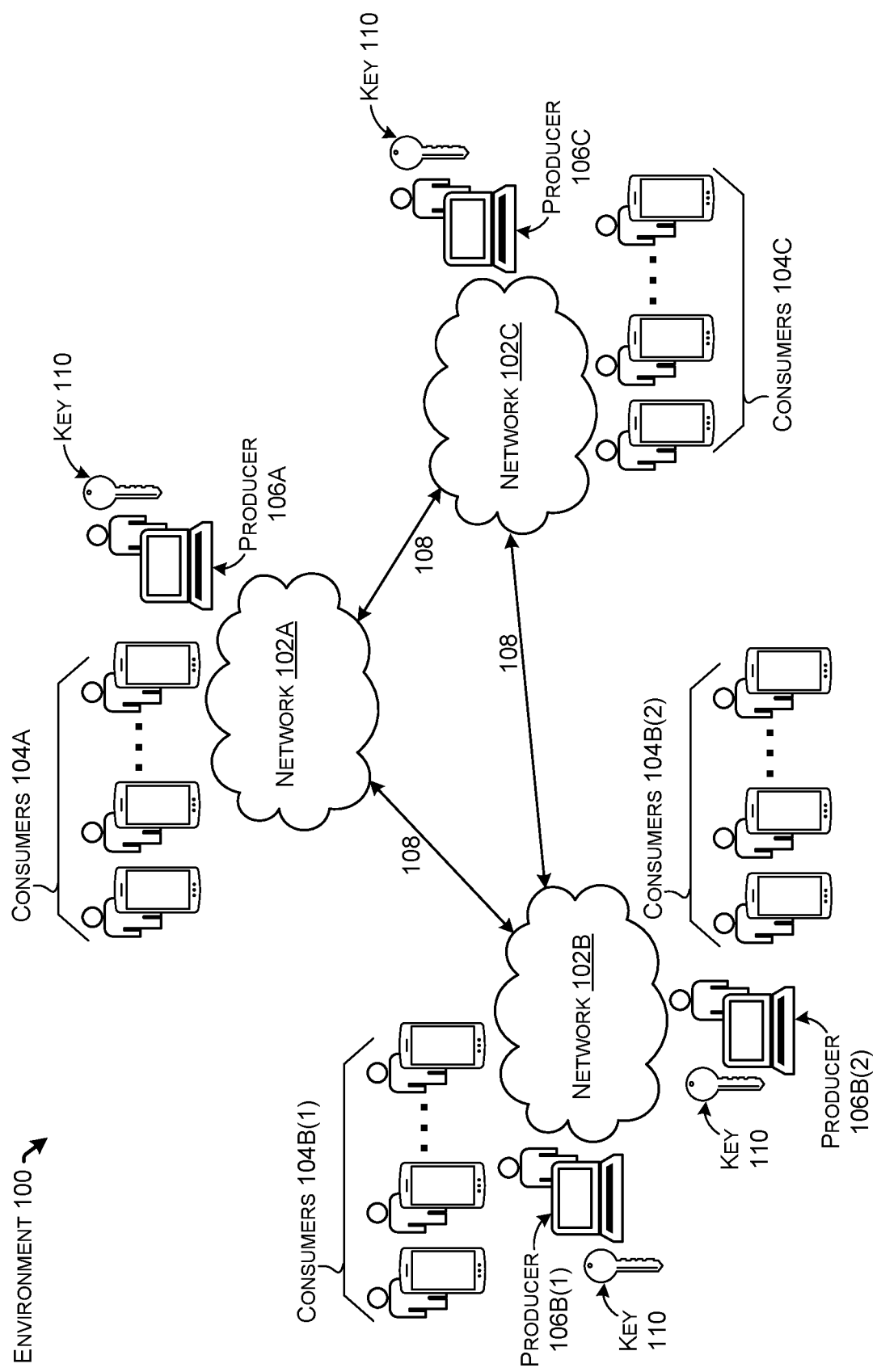
FIG. 1 illustrates a component diagram with an example environment in which group access control may be employed as part of communications between network devices, in accordance with the present concepts.

This disclosure describes, at least in part, a method that may be implemented by a producer device communicatively coupled to a consumer device. The method may include establishing a connection between authorized producers associated with a collaboration technology. The method may include generating an encryption key among the authorized producers using an encryption protocol. In some examples, the encryption key may be associated with content provided by the authorized producers to authenticated consumers during an event of the collaboration technology. The method may further include receiving, at an individual producer of the authorized producers, a partitioned set of authenticated requests from a subset of the authenticated consumers. In response to receiving the partitioned set of the authenticated requests, the method may include sending, by the individual producer, the encryption key to the subset of the authenticated consumers. Also, the method may include using the encryption key to establish at least one end-to-end encrypted channel between the individual producer and an individual consumer of the subset of the authenticated consumers to provide the content during the event.

This disclosure also describes, at least in part, another method that may be implemented by a producer device communicatively coupled to a consumer device. The method may include distributing a shared encryption key among authorized producers associated with a collaboration technology. The method may include receiving, by the authorized producers, authenticated requests from authenticated consumers associated with the collaboration technology. In some examples, the authenticated requests received by individual authorized producers may be received as partitioned subsets of the authenticated requests. The partitioned subsets may correspond to respective subsets of the authenticated consumers. In response to receiving the authenticated requests, the method may include sending, by the individual authorized producers, the shared encryption key to the respective subsets of the authenticated consumers. The method may further include using the shared encryption key, by the authorized producers, to encrypt content associated with the collaboration technology. Further, the method may include sending, by the authorized producers, the encrypted content to the authenticated consumers.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for controlling group access to a collaboration technology. The techniques may include control of encryption of content associated with the collaboration technology. For example, the collaboration technology may facilitate events in which one or more producers offer content to one or more consumers. The producers may wish to encrypt the content that is provided to the consumers. However, the scale of the event, such as the number of producers and/or consumers, may be initially unknown, may fluctuate, and/or may be relatively large, and therefore potentially difficult (e.g., resource-intensive) to manage. To overcome difficulties that may be associated with scale or fluctuation of an event associated with a collaboration technology, the techniques disclosed herein may include a mechanism for efficiently and securely controlling secure access of a scalable number of producers and consumers of content.

As used herein, a "collaboration technology" may refer to a wide variety of technologies (e.g., applications) via which users may provide content, consume content, and/or interact with other users, for instance. As such, a collaboration technology may include group communication (e.g., real-time communication), messaging, conferencing, etc. A collaboration technology may include audio, video, or both. The size of the group participating in an event associated with the collaboration technology may change or may not be known in advance. For instance, an "event" may refer to two users participating in a chat session using the collaboration technology. In contrast, the event may be a large conference or broadcast with an audience on the order of hundreds of thousands, or even millions of participants. Furthermore, the event and/or access to the content associated with the event may be multi-level or change over time. For instance, the event may be a small meeting where users join/leave over time. In this instance, a meeting organizer may prefer that participants not have access to the meeting content before/after being actively signed in to the event through the collaboration technology. In another instance, the event may be a large conference with multiple live events and sessions. In this instance, users may join the event by registering on the fly, or may have paid to access only a subset of the event contents (e.g., only one session out of several). Therefore management of the event may need to be "elastic" to allow for a fluctuation in the scale of the event. The disclosed techniques are intended to effectively and efficiently facilitate management of such disparate event scenarios.

In some examples, scalability of collaboration technologies may present challenges for controlling security of event content. For instance, end-to-end encryption may be used with a small-scale messaging application (app), where two users or a small group of users chat with each other. Also, encryption may be possible for a large event where consumers securely sign in to the collaboration technology to view/receive content. However, the underlying transport technologies employed in these different scenarios may be fundamentally different. For example, a group key agreement (GKA)-type protocol may be used for relatively smaller events, while a broadcast encryption (BE)-type protocol may be used for relatively larger events. Therefore, when an event grows from small to large, or when an audience member at a large conference wants to access a microphone and contribute content (e.g., a consumer wants to become a producer), access control and/or encryption may become problematic. Where a message is intended for many consumers, it may be too resource costly, untimely, or otherwise unmanageable to encrypt the message uniquely for each consumer. Individual and/or additional encryption keys may need to be generated, stored, and/or sent to other users, consuming computing resources, storage, and/or bandwidth. Therefore, it may be advantageous to have one encryption key for the group of producers and consumers, such that a message is encrypted with the one encryption key for the group, and the encrypted message is sent to however many consumers are in the group. In current practice, some schemes allow one key to be generated by a "middle box" in a collaboration technology system. However, in these schemes, the content is not end-to-end encrypted. Therefore, an infrastructure problem may arise, in which an unauthorized entity may access the encryption key via the middle box.

The disclosed techniques are intended to provide group access control to a collaboration technology in a wide-ranging spectrum of use cases—to potentially serve all sizes of events. In some examples, encryption, even end-to-end encryption, may be provided with a hybrid approach to handle fluctuating or unknown scale, and/or very large group sizes. For instance, handling of group access control from a perspective of producers in the group may be different than handling of group access control from a perspective of producers in the group. In some implementations, a tree-based group key arrangement may be used for producers, to be able to efficiently scale to a relatively large number of producers. Additionally, broadcast encryption (BE) concepts may be used with respect to consumers, to handle potentially enormous audience sizes. Further concepts to help manage group access control may include synchronous and asynchronous encryption key updates, as well as employing concepts involving epochs for updating an encryption key.

A hybrid approach for group access control to a collaboration technology may be provided via a hybrid information-centric networking (hICN) architecture, in some cases. An hICN architecture may enable use of unicast internet protocol (IP) to provide event scaling, enabling reliable multicast-like and/or anycast-like properties for events. Further, hICN may allow for security protocols, providing confidentiality and access control. In some examples, hICN may be viewed as a Layer 4/Layer 3 (L4/L3) protocol that can be used to serve a small or a very large group of end-points (e.g., users). The end-points may be equipped with an hICN stack. For instance, an end-point may be equipped with a unidirectional transport socket. A producer may be equipped with a unidirectional transport socket (e.g., producer socket) to send data, and a consumer may be equipped with a unidirectional transport socket (e.g., consumer socket) to receive data and/or to fetch data. Use of a unidirectional transport socket may be viewed as similar to real-time transport protocol (RTP), rather than bidirectional, like transmission control protocol (TCP).

In some examples, the current techniques for group access control may include generation of an encryption key (e.g., shared key) by one or more producers. For example, the producers may collaborate to generate the encryption key. The producers may use producer sockets to generate the encryption key. Also, the producer(s) may use messaging layer security (MLS) protocol, group key agreement (GKA), or some other appropriate security protocol, to generate the encryption key. For instance, the producers may use the producer sockets to exchange messages to implement the security protocol to create the encryption key. The encryption key may also be shared among producers. Further, the encryption key may be generated and distributed among the producers using a tree-based group key arrangement. A producer may then use the encryption key to encrypt data (e.g., content, media, a message, etc.) that the producer is generating and/or providing. The producers may use the same encryption key to encrypt content more than once, such as encrypting multiple successive messages, messages produced by different producers, etc. Overall, the ability to reuse an encryption key to encrypt multiple messages and/or encrypt a message intended for multiple consumers may greatly reduce an amount of encryption keys that any producer or other component of the collaboration technology system needs to store.

Once an encryption key is generated, the encryption key may then be distributed to any intended (authorized) consumers of the content (a scheme which may be viewed as similar to broadcast encryption), so that the consumers may decrypt any content/message generated by a producer. In this manner, multiple consumers may fetch content from a producer, and the multiple consumers may use the same encryption key to decrypt the content. Additionally or alternatively, a consumer may retrieve the encryption key from a first producer, but may fetch content from a second producer in the group. In this scenario, the encryption key from the first producer may be used to decrypt the content from the second producer. Note that some intermediate component of infrastructure in between a producer and/or consumer may receive or even store the encryption key, but the encryption key may be encrypted itself, so that the intermediate component may not decrypt and/or otherwise have access to the plain encryption key. Stated another way, the encryption key may remain secret outside the group of producers and consumers for the event, and the system may maintain end-to-end encryption of the content. Finally, access may be revoked from any consumer (and/or any producer) by updating the encryption key and adjusting distribution of the updated encryption key accordingly.

In some examples, the disclosed techniques may be used in additional applications, beyond messaging or conferencing type collaboration technologies. For instance, access control may be used in gaming applications, social media, healthcare applications, etc. The disclosed techniques may be useful in cloud telemetry environments. For instance, the disclosed techniques may be applied to aspects of data replication for cloud data bases. In another instance, the disclosed techniques may help manage security and performance issues with inter-data-center workloads. The scenarios described herein are not meant to be limiting, a wide variety of applications are contemplated.

To summarize, the current techniques may be used to implement group access control for scalable content delivery. The current techniques may be able to provide elastic, end-to-end encryption for content including audio, video, and/or messaging. The current techniques may perform event management with a single transport technology, wherein the underlying transport technology may not need to change to accommodate an event of changing size, scope, scale, and/or other parameters. Further, the current techniques may address revocation of group access. In some examples, the implementation of hICN with the security protocol described herein may enable existing collaboration technology applications (e.g., videoconferencing programs) to use the same media engine for relatively small, medium, or large meetings, but also very large events. Finally, the current techniques may be viewed as a lightweight solution, featuring both relatively low computational and memory cost, as well as relatively low bandwidth usage for accomplishing group access control.

Although the examples described herein may refer to the use of hICN and/or an end-point device as the point of generation of access control concepts, the techniques can generally be applied to any device in a network. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications and/or security. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications and/or security across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present reusable acknowledgment concepts. Example environment 100 may include one or more networks 102. The networks may include one or more consumers 104 and/or producers 106 (e.g., user(s)). In some cases, letters are utilized after a reference number to distinguish like elements. For instance, three networks 102 are shown in FIG. 1, including network 102A, network 102B, and network 102C. Use of the reference number without the associated letter is generic to the element. Similarly, in some cases, parentheticals are utilized after a reference number/letter to distinguish like elements. For instance, FIG. 1 shows two sets of consumers 104B associated with network 102B, including consumers 104B(1) and consumers 104B(2). Here again, use of the reference number without the associated parenthetical is generic to the element.

A network 102 may represent one or more of various devices, such as computing devices, servers, routers, switches, etc. (not shown). A network 102 may include producer(s) 106 and/or consumer(s) 104 associated with a collaboration technology. As such, the network may include various user devices such as computers, laptops, mobile devices, tablets, etc. associated with a producer 106 and/or consumer 104. Note that in FIG. 1, the depiction of a consumer 104 with a smart phone-type device or a producer 106 with a laptop (or other computer) is not meant to be limiting. Different consumers 104 or producers 106 may access a collaboration technology with any of a variety of devices (e.g., end points, clients, etc.). Within the example environment 100, any devices of networks 102 and/or other devices may exchange communications (e.g., packets) via wired or wireless network connection(s) such as those suggested by arrows 108. For instance, network connections may be transport control protocol (TCP) network connections or any network connection (e.g., information-centric networking (ICN)) that enables a device of a network 102 to exchange packets with other devices. Network connections 108 may represent, for example, data paths between a consumer 104 and/or a producer 106. Network connections 108 may also represent a data path between routers, servers, or other devices of one or more networks 102, etc. It should be appreciated that the term "network connection" may also be referred to as a "network path."

FIG. 1 also includes an encryption key 110. FIG. 1 includes several instances of encryption key 110, indicating that copies of encryption key 110 are associated with several devices of example environment 100. As such, FIG. 1 illustrates a scenario in which encryption key 110 may be used by one or more producers to encrypt various instances of content (e.g., data, messages, audio media, video media, etc.). Also, encryption key 110 may be used by one or more consumers to decrypt various instances of content. Stated another way, encryption key 110 may be considered a shared encryption key. A description of the generation and distribution of the encryption key 110 is provided below.

FIG. 1 may be considered an illustration for a scenario including an event offered via a collaboration technology. For instance, an organization may wish to host or otherwise provide a virtual conference (e.g., event) that includes several producers 106 and many consumers 104. The event participants, including producers 106 and consumers 104, may be referred to as a "group" associated with the event. The group may therefore include "n" devices (e.g., clients, end-points). However, only a subset of n, the producers 106, may be authorized to produce and/or provide content for the event. In contrast, all consumers 104 may be authenticated to be able to consume content produced by the producers 106. Note also that any producer 106 may be authenticated to consume content as well. For instance, a producer authorization may include permission to consume content for the event. Authorization and/or authentication of producers 106 and/or consumers 104 may be accomplished via a variety of methods. (Some examples of authorization and/or authentication will be provided further below.)

The producers 106 of example environment 100 may be independent from one another in terms of producing content for the event. For example, producer 106A and producer 106B(1) may both be producing content, such as speaking at the virtual conference. Therefore, producer 106A and producer 106B(1) are independently producing content in this example, because the content is different (e.g., different audio and/or video). However, the different content is still encrypted with the same, single encryption key 110 before delivery to any consumer 104.

Figure 2:
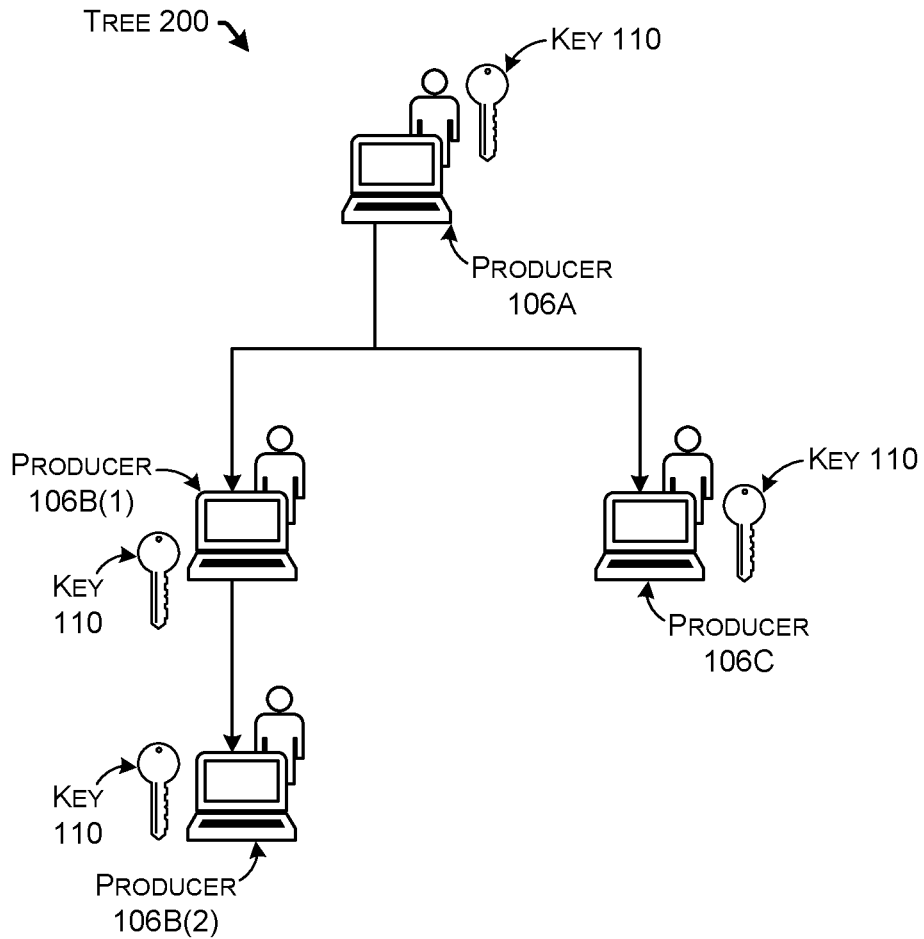
FIG. 2 illustrates an example tree-based group key agreement that relates to the component diagram illustrated in FIG. 1, in accordance with the present concepts.

In some examples, producers 106 may collaborate to agree on an encryption key 110 (e.g., shared secret) for content associated with the event. A producer 106 may establish a connection with one or more other producers 106 in order to collaborate. Once connected, producers 106 may use an encryption protocol such as MLS or GKA. By working collaboratively, producers 106 may generate and/or distribute encryption key 110, as suggested in FIG. 1. In some implementations, a tree-based group key agreement (tree 200) may be arranged among producers 106, as shown in FIG. 2, for the purpose of generating and/or distributing encryption key 110. As illustrated in FIG. 2, producer 106A may be at the top of a hierarchy of tree 200, which may then branch to producer 106B(1) and producer 106C. Tree 200 may then further branch from producer 106B(1) to producer 106B(2).

Referring again to FIG. 1, a consumer 104 may send a request to a producer 106 regarding content related to the event. The request may be a request for permission to access the content, for instance. The consumer 104 may have already been authenticated, such as by registering and/or signing in to the virtual conference. (Authentication examples will be described further below). Since consumer 104 is already authenticated with respect to the event, the request may be viewed as an authenticated request. Therefore, for instance, a consumer 104A may send an authenticated request to producer 106A. Producer 106A may respond to the request by returning encryption key 110. After receiving encryption key 110, consumer 104A may then be able to decrypt the content related to the event. In some examples, a consumer 104 may be able to use encryption key 110 to establish an end-to-end encrypted channel with a producer 106, for instance.

In the case of a large and/or growing event, requests to producers 106 coming from consumers 104 may be partitioned among the producers 106. The partitioning (or other scheme for management of requests) may be based on a variety of variables, such as network latency, network load, host latency, host load, congestion, geography, etc., and/or a combination of variables. Partitioning may be particularly helpful for balancing and/or scaling encryption key distribution for an event. For instance, in order to reduce latency associated with geographic distribution, a request from a consumer 104A may be routed and/or assigned to producer 106A. However, a request from a consumer 104C may be routed and/or assigned to producer 106C. In some implementations, a consumer 104 may determine which producer 106 to send a request for the encryption key 110. For instance, a consumer 104 may consider network information such as minimum latency and/or load from the consumer 104 to various producers 106. In some examples, a consumer 104 may obtain network information passively, such as using an hICN request/reply toward a name prefix of a producer 106. Alternatively, a consumer 104 may be able to obtain network information off-band, for instance. Other schemes for determining partitioning of requests among producers 106 are contemplated. For example, requests may be partitioned among producers 106 based on some attribute of the producers 106 and/or attribute of the consumer 104. Requests may be partitioned based on a level or degree of access for which a subset of consumers is authenticated, for instance.

Note that once a request from a consumer 104 is fulfilled, the consumer may be able to decrypt content from potentially any producer 106 in the group. For example, consumer 104C may receive a copy of encryption key 110 from producer 106C. With the copy of the encryption key 110, consumer 104C may then be able to decrypt content from producer 106B(2). In this manner, a producer 106 may serve a partition of the consumers 104 by responding to requests for the encryption key 110, thereby enabling efficient event scaling. However, a producer 106 may be able to provide content to any consumer 104 in the event group, regardless of whether that particular producer 106 provided the encryption key 110 to that consumer 104. Furthermore, the producer 106 may also act as a revocation service for a partition of the consumers 104. Examples of revocation will be provided further below.

In some implementations, a producer 106 may encrypt the encryption key 110 before sending to a consumer 104. For example, the producer 106 may have access to a public key of the consumer 104. The public key of the consumer 104 may have been provided by the consumer 104 as part of a registration and/or login for the event, for instance. The producer 106 may use the public key of the consumer 104 to encrypt the encryption key 110. The consumer 104 may then use the private key that pairs with the public key to decrypt the encryption key 110. Thus the consumer 104 is able to use the decrypted encryption key 110 to access content of the event.

The mechanism of key generation and/or distribution described above may be activated when a number of consumers 104 exceeds a threshold, in some cases. For instance, the threshold may correspond to an upper limit (or nearing an upper limit) of consumers 104 that an encryption protocol (e.g., MLS) can reasonably serve in terms of resource cost, such as memory, computational resources, bandwidth, delay budget, etc.

The present group access concepts may include provisions for updating the encryption key 110. Updating the encryption key 110 may help improve security or may be useful for other event management purposes. Encryption protocols (e.g., GKA, MLS, BE, etc.) may be equipped with a rekey mechanism that may be used to update the encryption key 110. The encryption key 110 may be updated synchronously or asynchronously. For instance, the encryption key 110 may be updated synchronously (e.g., by epoch), or asynchronously (e.g, triggered). An example of a trigger for an encryption key 110 update includes a group member joining or leaving the event. The present group access concepts may include maintaining a list of authorized consumers 104 and another list of revoked consumers 104. The list(s) may then be shared among the producers 106. Note that the encryption protocol used by the producers 106 may have a provision to manage updates, insertion, and/or removal of authorized producers 106. A change in the consumers 104 (e.g., addition, removal) may trigger an update of the encryption protocol and/or an update of the encryption key 110. Another trigger may include where a consumer 104 becomes a producer 106. For instance, a client in a video conference may be granted permission to speak into a microphone.

The present group access concepts may include employing both synchronous and asynchronous updates to the encryption key 110, so that the encryption key 110 is automatically updated (e.g., by epoch) even if there is no update trigger. The encryption key 110 may be updated synchronously if the encryption key 110 has not been updated by the end of an epoch period, for instance. In some cases, updating by epoch, or otherwise synchronously updating, can be implemented by triggering a shadow update to an encryption protocol (e.g., MLS). In some cases, updating by epoch may help improve security for a large event and/or as an event scales up in size. For instance, security properties of some encryption protocols (e.g., MLS/ART (asynchronous ratchet tree)) may be weakened by sharing an encryption key 110 in a broadcast-like manner to a very large number of devices (e.g., consumers). Synchronous updating by epoch may help improve security for these cases, rather than relying on an update trigger.

In some examples, the present concepts may be used to allow a sub-group of consumers to access a portion of content from an event. For instance, the event may be a video conference call in which smaller subset of consumers and/or producers may wish to engage in a side chat, separate from the main conference call. In another instance, the event may be a large conference in which some of the consumers only register for portion of the content, not for the whole event. A consumer may register for one conference session out of multiple conference sessions, for instance. Sharing of a portion of content with a sub-group of users may be achieved by publishing the content on a different hICN namespace, in some examples. For instance, a different or additional encryption key may be provided to the sub-group of consumers.

In some implementations, a producer may be able to remain independent of any network infrastructure. For example, a producer operating via a producer socket (e.g., hICN producer socket) may bind to a location-independent internet protocol (IP) address (e.g., not used by any particular network interface). Therefore, a namespace, or the usage of namespace, may be viewed as a network unicast namespace, not allocated to any particular network interface. With the present concepts, an application may then be able to multiplex data into different namespaces (e.g., the producer application programming interface (API)), as long as the host has enough namespace capacity, for instance. Note that the network namespace structure may not require following an application namespace structure, such as for anonymization reasons. For instance, a group definition may include a static allocated set of bits in the IPv6 address container, but may include a pseudo-random mapping from the application level group definition.

An example method for authentication of a consumer(s) to an event will now be described. The example is not meant to be limiting, other methods for authenticating consumers are contemplated. As introduced above, a consumer may request access to content of an event. The consumer may encrypt the request using a private key. The private key may be a long-term private key of the consumer. The private key may correspond to a public key that has already been shared with an entity associated with the event. The request from the consumer may be relatively small. In some cases, the request may simply indicate an identity of a group and/or event that the consumer wishes to join and/or access. In some examples, such as hICN, the request may include 128 bits of an associated name prefix. The request may be hashed before encryption, for instance using SHA-2, in some cases. Optionally, the request may also carry the public key of the consumer in the clear. Stated another way, a consumer may send an authorized request to a producer by signing an interest packet and sending the packet toward a routable prefix of a producer.

A producer that receives an authenticated request from a consumer may decrypt the request (or the signature in the request). In this manner, the producer may obtain a group ID and a hash of the request, if available. Where the hash is available, the producer may compute the hash of the received request and compare the computed hash with the received hash (e.g. SHA-2). Further, the request may contain a locator of the consumer. The locator may be used by the producer to send an encryption key (e.g., shared key) back to the consumer. The producer may encrypt a message that includes the encryption key to send to the consumer. The message may be encrypted with the public key of the consumer.

An example method for revoking a consumer or producer between epochs will now be described. At the beginning of an epoch, a list of authorized consumers may be known to one or more producers of a group. In some examples, identity-based, attribute-based-encryption (ID-ABE) may be used for revocation of a consumer. For instance, when a consumer is revoked, an ID of the consumer is appended to a revocation list. The ID may be appended as an attribute in ABE, for example. The revocation list may be known among all producers, based on revocation events. Note that in an instance where a producer is revoked, the shared encryption key may be compromised, and may be updated. Updating the encryption key may be performed using an update trigger via MLS, ART, GKA, etc. After updating an encryption key, authentication of consumer(s) may be repeated. Revoking a consumer or producer between epochs may be done at any time within an epoch. Revoking a producer may be viewed as having priority over revoking a consumer, in some cases. For instance, an unauthorized producer may present a greater security risk than an unauthorized/unauthenticated consumer. In a case where a producer changes namespace, the change may trigger an update to the encryption key. The update may include generation of a new tree-based group key agreement. In some examples, updating an encryption key between epochs may correspond to initializing a new epoch with an empty revocation list. Stated another way, an asynchronous key update triggered between epochs may restart the clock relative to epochs, rather than waiting for the next scheduled epoch.

In some examples, an amount of state maintained at a producer and/or consumer may be relatively low while implementing group access control concepts. For example, state maintained at a producer may correspond to the revocation list. State maintained at the producer may also correspond to a list of authorized consumers. Further, state maintained at the producer may correspond to a tree-based group key agreement (e.g., an MLS, GKA, or ART tree). A consumer may be stateless. As such, the present group access control concepts may be viewed as a relatively lightweight solution for implementing scalable group access control.

Figure 3:
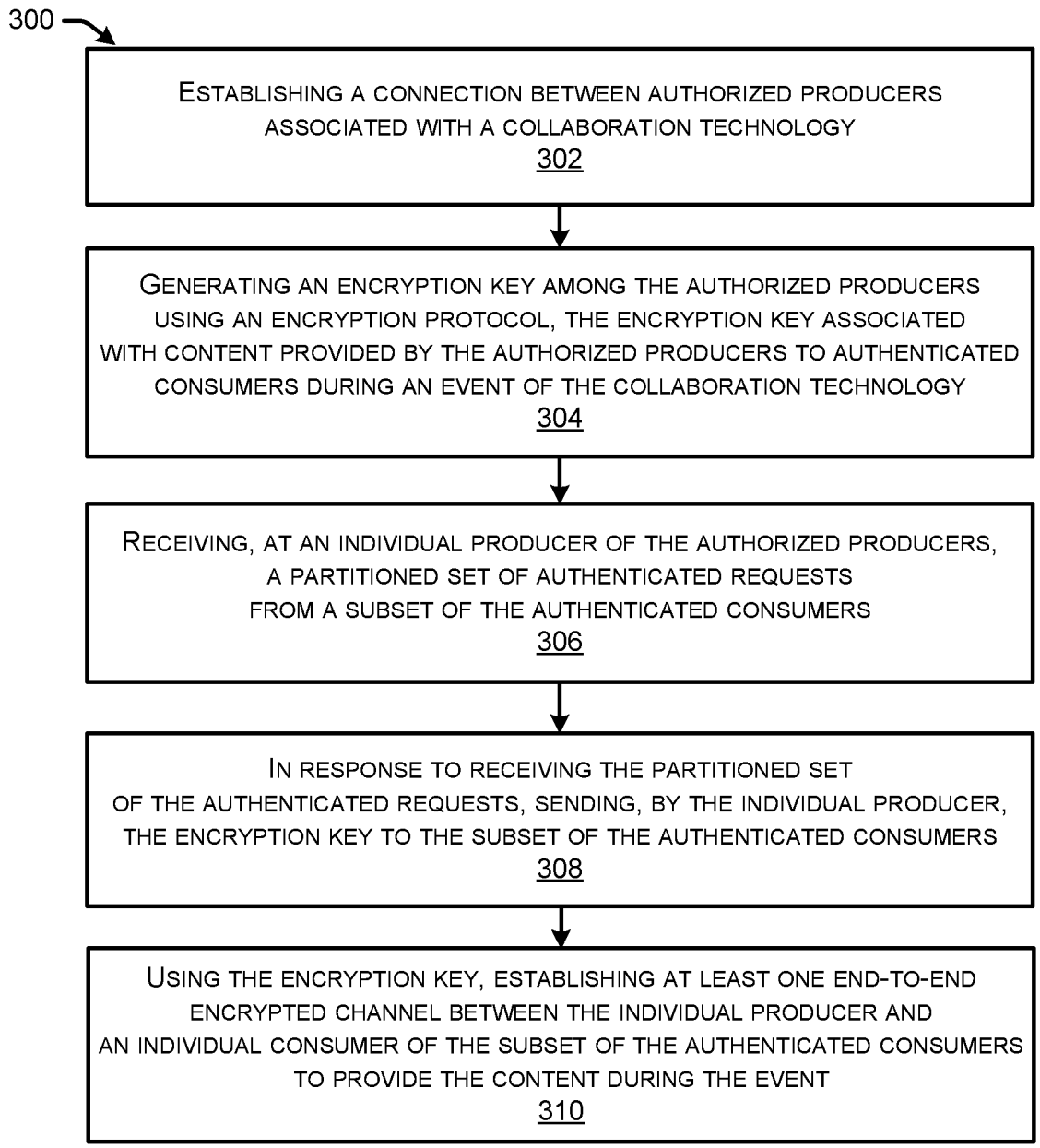
FIGS. 3 and 4 illustrate flow diagrams of example methods for performing group access control as a part of communications among network devices, in accordance with the present concepts.
Figure 4:
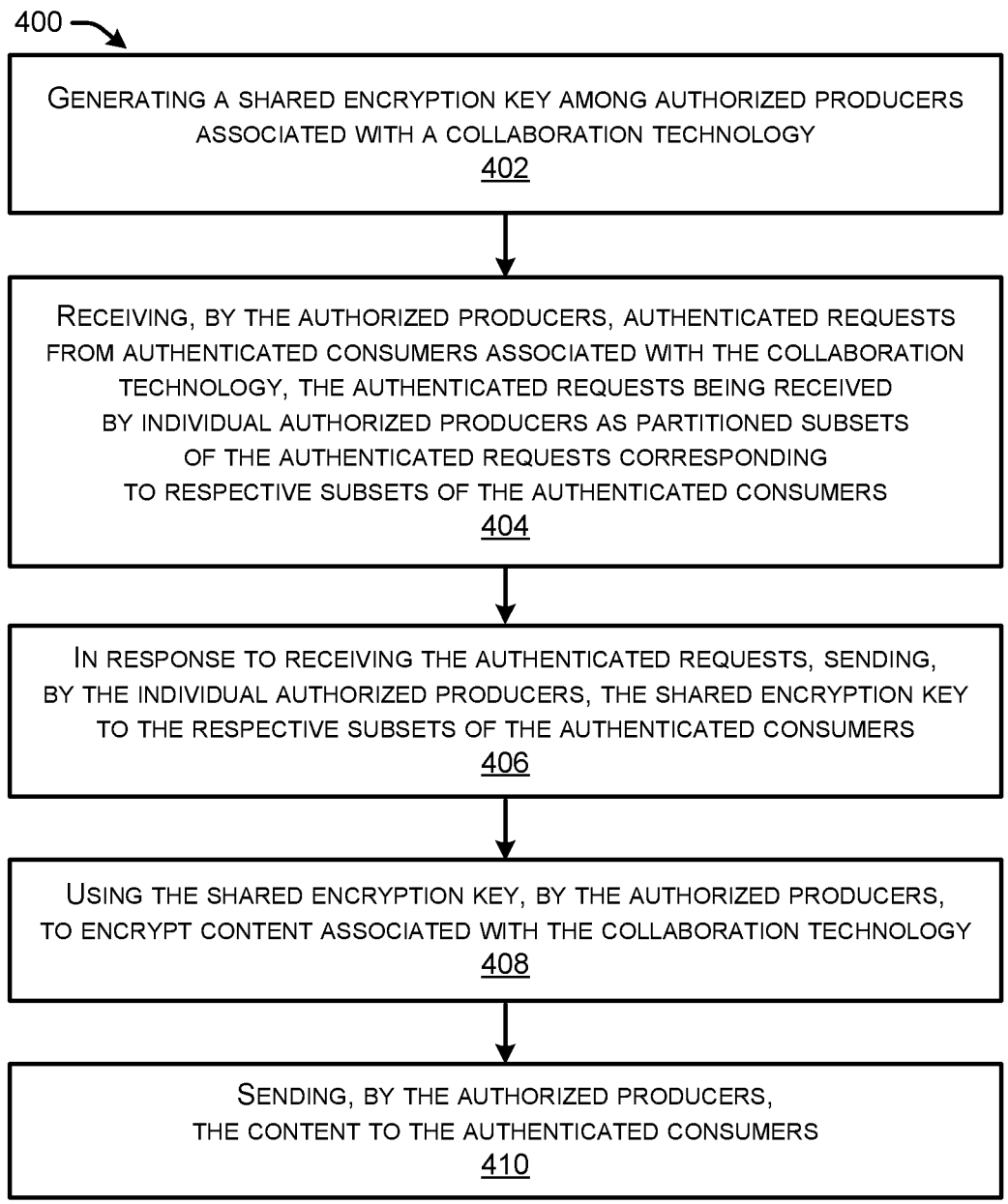

FIGS. 3 and 4 illustrate flow diagrams of example methods 300 and 400 that include functions that may be performed at least partly by a producer device, such a producer 106 described relative to FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 3 and 4 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 3 illustrates a flow diagram of an example method 300 for a network device to perform group access control techniques. Method 300 may be performed by a producer device (e.g., producer 106) communicatively coupled to at least one consumer device (e.g., consumer 104), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include establishing a connection between authorized producers. The authorized producers may be associated with a collaboration technology.

At 304, method 300 may include generating an encryption key among the authorized producers. The encryption key may be generated using an encryption protocol. The encryption key may be associated with content provided by the authorized producers to authenticated consumers during an event of the collaboration technology, for instance. In some examples, generation of the encryption key may also be viewed as distribution of the encryption key among the authorized producers. For example, the encryption key may be agreed upon among the authorized producers, such as in a tree-based group key agreement, etc.

At 306, method 300 may include receiving, at an individual producer of the authorized producers, a partitioned set of authenticated requests. The partitioned set may be received from a particular subset of the authenticated consumers. In some examples, the partitioned set may have been selectively partitioned for the individual producer based at least in part on a comparison of a network latency associated with the individual producer and another network latency associated with a different individual producer of the authorized producers. In other examples, the partitioned set may have been selectively partitioned for the individual producer based at least in part on a comparison of a geographic location of the individual producer and another geographic location of a different individual producer of the authorized producers. In some examples, method 300 may further include receiving a second partitioned set of the authenticated requests from a second subset of the authenticated consumers. For example, the second partitioned set of the authenticated requests may be received at a second individual producer of the authorized producers. In response to the second partitioned set of the authenticated requests, method 300 may include sending, by the second individual producer, the encryption key to the second subset of the authenticated consumers. In this manner, the requests may be partitioned and/or distributed among producers in order to help lower overall latency associated with the event, to prevent bottlenecks of load at any particular producer, and/or to otherwise manage group access for the event.

At 308, method 300 may include sending, by the individual producer, the encryption key to the subset of the authenticated consumers. The encryption key may be sent by the individual producer to the subset of the authenticated consumers in response to receiving the partitioned set of the authenticated requests.

At 310, method 300 may include establishing at least one end-to-end encrypted channel between the individual producer and an individual consumer of the subset of the authenticated consumers. The channel may be established using the encryption key. The channel may be established to provide the content during the event to the authenticated consumers. In some examples, establishing the end-to-end encrypted channel may simply refer to encrypting the content, by a producer, before providing the content to an authenticated consumer.

In some examples, method 300 may further include determining that a second individual producer of the authorized producers was added or removed from the authorized producers. In response to determining that the second individual producer was added or removed, method 300 may include generating and/or distributing a second encryption key among the authorized producers. Furthermore, in some examples, method 300 may include determining that a second individual consumer was added or removed from the authenticated consumers. In response to determining that the second individual consumer was added or removed, method 300 may include generating and/or distributing a second encryption key among the authorized producers.

In some examples, method 300 may further include determining that a threshold amount of time has passed since the encryption key was generated. For instance, an epoch interval corresponding to the threshold amount of time may have been established for the event. In response to determining that the threshold amount of time has passed, method 300 may include generating and/or distributing a second encryption key among the authorized producers.

FIG. 4 illustrates a flow diagram of an example method 400 for a network device to perform group access control techniques. Method 400 may be performed by a producer device (e.g., producer 106) communicatively coupled to at least one consumer device (e.g., consumer 104), for instance. In some examples, method 400 may be performed by a computing device comprising one or more processors and one or more non-transitory computer-readable media storing computer-executable instructions that, when executed by the one or more processors, cause the one or more processors to perform method 400.

At 402, method 400 may include generating a shared encryption key among authorized producers associated with a collaboration technology. For example, the shared encryption key may be agreed upon according to a group key agreement among the authorized producers, such as a tree-based group key agreement, etc.

At 404, method 400 may include receiving, by the authorized producers, authenticated requests from authenticated consumers associated with the collaboration technology. In some examples, the authenticated requests may be received by individual authorized producers as partitioned subsets of the authenticated requests. For instance, an individual authorized producer may receive a particular partitioned subset of the authenticated requests that corresponds to a respective subset of the authenticated consumers. In some examples, the authenticated requests may be partitioned based at least in part on a comparison of network latency or network load among the authorized producers. In other examples, the authenticated requests may be partitioned based at least on a comparison of geographic location among the authorized producers.

At 406, in response to receiving the authenticated requests, method 400 may include sending, by the individual authorized producers, the shared encryption key to the respective subsets of the authenticated consumers. For instance, an individual authorized producer may send the shared encryption key to the respective subset of the authenticated consumers from which that individual authorized producer received that corresponding partitioned subset of the authenticated requests. Stated another way, any given authorized producer may service a particular subset of authenticated consumers by receiving requests from that particular subset and sending a shared encryption key to that subset.

At 408, method 400 may include encrypting, by the authorized producers, content associated with the collaboration technology. In some examples, the content may be encrypted using the shared encryption key.

At 410, method 400 may include sending, by the authorized producers, the encrypted content to the authenticated consumers. In some examples, method 400 may further include updating the shared encryption key among the authorized producers based at least in part on an encryption key update trigger. For instance, an encryption key update trigger may include a change in a number of the authenticated consumers and/or producers, such as when a consumer and/or producer is added or removed from the event group, or when a consumer becomes a producer, etc. Updating of the shared encryption key may be viewed as the authorized producers generating a new encryption key by agreeing on the new encryption key, for instance. In other examples, method 400 may include updating the shared encryption key based at least in part on a threshold amount of time having passed since generation of the shared encryption key.

Figure 5:
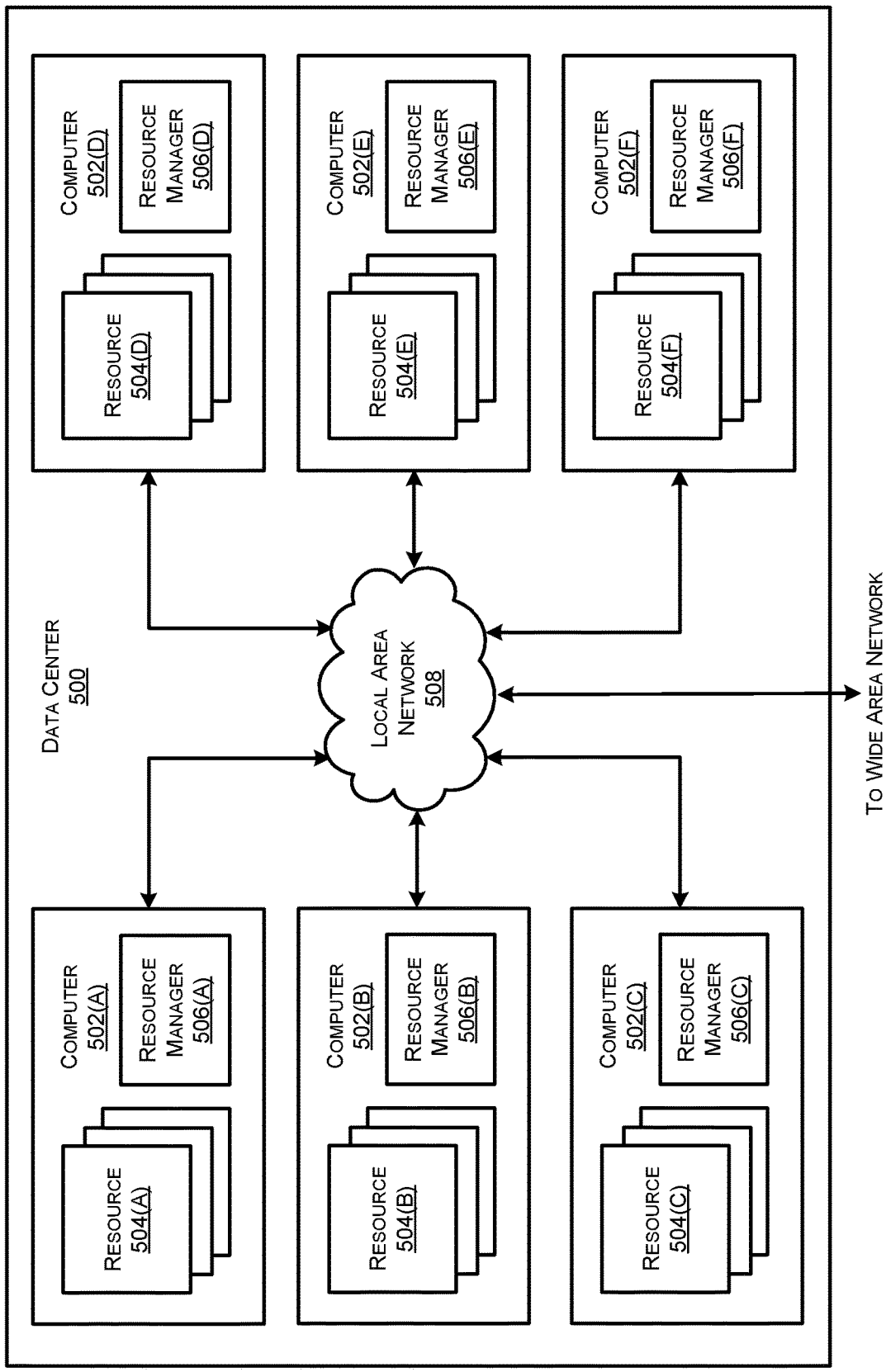
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the data center 500 may include, or correspond to, a network of devices described herein, such as a network 102. In some examples, the resources and/or computers 502 may include, or correspond to, any type of networked device described herein, such a producer 106 and/or a consumer 104. Although, computers 502 may comprise any type of networked device, such as servers, switches, routers, hubs, bridges, gateways, modems, repeaters, access points, hosts, etc.

The computers 502 can be standard tower, rack-mount, or blade server computers configured appropriately for providing computing resources. In some examples, the computers 502 may provide computing resources 504 including data processing resources such as virtual machine (VM) instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. Computers 502 in the data center 500 can also be configured to provide network services and other types of services.

In the example data center 500 shown in FIG. 5, an appropriate local area network (LAN) 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein. For instance, the containers and/or virtual machines may serve as server devices, user devices, and/or routers in a network 102.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
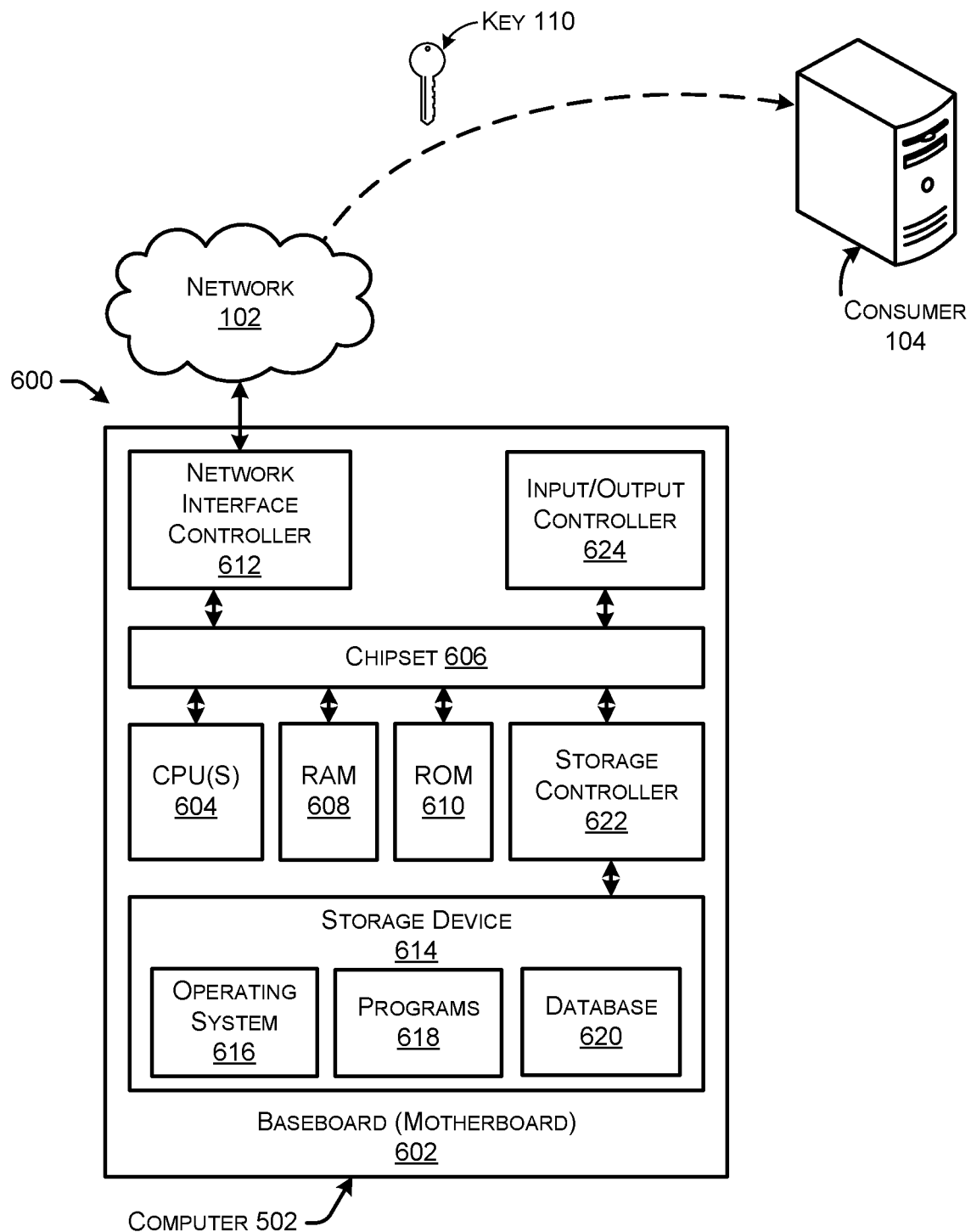
FIG. 6 is a computer architecture diagram showing an illustrative computer hardware architecture for implementing a device that can be utilized to implement aspects of the various technologies presented herein.

FIG. 6 shows an example computer architecture 600 for a computer 502 capable of executing program components for implementing the functionality described above. The computer architecture 600 shown in FIG. 6 illustrates a conventional server computer, workstation, desktop computer, laptop, tablet, network appliance, e-reader, smartphone, and/or other computing device, and can be utilized to execute any of the software components presented herein. The computer 502 may, in some examples, correspond to a physical device described herein (e.g., producer, consumer, server device, user device, router, etc.), and may comprise networked devices such as servers, switches, routers, hubs, bridges, gateways, modems, repeaters, access points, etc. For instance, computer 502 may correspond to a producer 106.

As shown in FIG. 6, the computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as a network 102 and/or network 508. The chipset 606 can include functionality for providing network connectivity through a network interface controller (NIC) 612, such as a gigabit Ethernet adapter. The NIC 612 is capable of connecting the computer 502 to other computing devices over a network 102. For instance, in the example shown in FIG. 6, NIC 612 may help facilitate transfer of data, packets, and/or communications, such as encryption key 110 or requests, over a network 102 with consumer 104. It should be appreciated that multiple NICs 612 can be present in the computer 502, connecting the computer to other types of networks and remote computer systems.

The computer 502 can be connected to a storage device 614 that provides non-volatile storage for the computer. The storage device 614 can store an operating system 616, programs 618, an encryption key 110, and/or other data. The storage device 614 can be connected to the computer 502 through a storage controller 622 connected to the chipset 606, for example. The storage device 614 can consist of one or more physical storage units. The storage controller 622 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 614 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 614 is characterized as primary or secondary storage, and the like.

For example, the computer 502 can store information to the storage device 614 by issuing instructions through the storage controller 622 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 614 by detecting the physical states or characteristics of one or more particular locations within the physical storage units.

In addition to the mass storage device 614 described above, the computer 502 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 502. In some examples, the operations performed by network 102, and or any components included therein, may be supported by one or more devices similar to computer 502. Stated otherwise, some or all of the operations performed by network 102, and or any components included therein, may be performed by one or more computer devices 502 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 614 can store an operating system 616 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 614 can store other system or application programs and data utilized by the computer 502.

In one embodiment, the storage device 614 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regards to FIGS. 1-4. The computer 502 can also include computer-readable storage media having instructions stored thereupon for performing any of the other computer-implemented operations described herein.

The computer 502 can also include one or more input/output controllers 624 for receiving and processing input from a number of input devices, such as a keyboard, a mouse, a touchpad, a touch screen, an electronic stylus, or other type of input device. Similarly, an input/output controller 624 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise one or more devices, such as a producer 106, a consumer 104, and/or other devices. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by a producer 106, a consumer 104, and/or other devices. In some examples, the communications may include data, packets, requests, encryption keys, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 618 may comprise any type of programs or processes to perform the techniques described in this disclosure in accordance with group access control techniques. For instance, the programs 618 may cause the computer 502 to perform techniques for communicating with other devices using any type of protocol or standard usable for determining connectivity. Additionally, the programs 618 may comprise instructions that cause the computer 502 to perform the specific techniques for performance of group access control concepts.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
   establishing a connection between authorized producers associated with a collaboration technology;
   generating a first encryption key among the authorized producers using an encryption protocol, the first encryption key associated with content provided by the authorized producers to a first subset of authenticated consumers during an event of the collaboration technology, the content provided via a hybrid information-centric networking (hICN) architecture using unicast internet protocol;
   receiving, at a first individual producer of the authorized producers, a partitioned set of authenticated requests from a second subset of the authenticated consumers;
   determining that the partitioned set of the authenticated requests from the second subset of the authenticated consumers is associated with surpassing a threshold number of consumers during the event;
   in response to determining that the threshold number of consumers will be surpassed during the event, sending, by the first individual producer, a second encryption key to the second subset of the authenticated consumers, the second encryption key associated with a second individual producer of the authorized producers; and
   using the second encryption key, establishing at least one end-to-end encrypted channel between the second individual producer of the authorized producers and an individual consumer of the second subset of the authenticated consumers to provide the content during the event.

2. The computer-implemented method of claim 1, wherein the partitioned set of authenticated requests is selectively partitioned for the first individual producer based at least in part on a comparison of a network latency associated with the first individual producer and another network latency associated with a third individual producer of the authorized producers.

3. The computer-implemented method of claim 1, wherein the partitioned set of authenticated requests is selectively partitioned for the first individual producer based at least in part on a comparison of a geographic location of the first individual producer and another geographic location of a third individual producer of the authorized producers.

4. The computer-implemented method of claim 1, further comprising:
updating the first encryption key among the authorized producers based at least in part on an encryption key update trigger.

5. The computer-implemented method of claim 1, wherein the first encryption key and the second encryption key allow the first subset and the second subset of the authenticated consumers to access the content provided by a third individual producer of the authorized producers.

6. The computer-implemented method of claim 5, further comprising:
maintaining a shared list among the authorized producers, the shared list including the authenticated consumers and revoked consumers.

7. The computer-implemented method of claim 6, further comprising:
generating, by the first individual producer, an updated first encryption key;
based at least in part on the shared list, determining a portion of the first subset of the authenticated consumers that remain unrevoked; and
distributing the updated first encryption key to the unrevoked portion of the first subset of the authenticated consumers, the updated first encryption key allowing the unrevoked portion of the first subset to access the content provided by the third individual producer.

8. A producer device comprising:
one or more processors; and
one or more non-transitory computer-readable media storing computer-executable instructions that, when executed by the one or more processors, cause the one or more processors to:
establish a connection with one or more additional authorized producers associated with a collaboration technology;
participate in generation of a first encryption key with the one or more additional authorized producers using an encryption protocol, the first encryption key associated with access to content provided to a first subset of authenticated consumers during an event of the collaboration technology;
in response to receiving a first partitioned set of authenticated requests from the first subset of the authenticated consumers, send the first encryption key to the first subset of the authenticated consumers;
using the first encryption key, establish at least one end-to-end encrypted channel with an individual consumer of the first subset of the authenticated consumers to provide the content via a hybrid information-centric networking (hICN) architecture using unicast internet protocol during the event;
receive a second partitioned set of the authenticated requests from a second subset of the authenticated consumers;
determine that the first subset of the authenticated consumers and the second subset of the authenticated consumers together surpass a threshold number of consumers during the event; and
in response to determining that the threshold number of consumers is surpassed by the first subset and the second subset together, participate in generation of a second encryption key with the one or more additional authorized producers, the second encryption key used by one of the one or more additional authorized producers to establish a second end-to-end encrypted channel with another individual consumer of the second subset of the authenticated consumers to provide the content during the event.

9. The producer device of claim 8, wherein the authenticated requests are selectively partitioned based at least in part on a comparison of a network latency associated with the producer device and another network latency associated with an individual producer of the one or more additional authorized producers.

10. The producer device of claim 8, wherein the authenticated requests are selectively partitioned based at least in part on a comparison of a geographic location of the producer device and another geographic location of an individual producer of the one or more additional authorized producers.

11. The producer device of claim 8, wherein the computer-executable instructions further cause the one or more processors to:
in response to an individual producer being added or removed from the event, participate in generation of an updated encryption key with the one or more additional authorized producers.

12. The producer device of claim 8, wherein the computer-executable instructions further cause the one or more processors to:
in response to an individual authenticated consumer being added or removed from the event, participate in generation of an updated encryption key with the one or more additional authorized producers.

13. The producer device of claim 8, wherein the computer-executable instructions further cause the one or more processors to:
in response to a threshold amount of time having passed since the first encryption key was generated, participate in generation of an updated encryption key with the one or more additional authorized producers.

14. The producer device of claim 8, wherein the computer-executable instructions further cause the one or more processors to:
provide the content to other individual consumers of a third subset of the authenticated consumers, wherein the other individual consumers received the first encryption key from one of the additional authorized producers.

15. A method comprising:
establishing a connection between authorized producers associated with a collaboration technology;
generating a first encryption key among the authorized producers using an encryption protocol, the first encryption key associated with content provided by the authorized producers to a first subset of authenticated consumers during an event of the collaboration technology;

receiving, at a first individual producer of the authorized producers, additional authenticated requests from a second subset of the authenticated consumers;

determining that the additional authenticated requests from the second subset of the authenticated consumers is associated with surpassing a threshold number of consumers during the event;

in response to determining that the threshold number of consumers will be surpassed during the event, sending, by the first individual producer, a second encryption key to the second subset of the authenticated consumers, the second encryption key associated with a second individual producer of the authorized producers; and using the second encryption key, establishing at least one end-to-end encrypted channel between the second individual producer of the authorized producers and an individual consumer of the second subset of the authenticated consumers to provide the content via a hybrid information-centric networking (hICN) architecture using unicast internet protocol.

16. The method of claim 15, wherein the additional authenticated requests are selectively partitioned for the second individual producer based at least in part on a comparison of a network latency associated with the second individual producer and another network latency associated with a third individual producer of the authorized producers.

17. The method of claim 15, wherein the additional authenticated requests are selectively partitioned for the second individual producer based at least in part on a comparison of a geographic location of the second individual producer and another geographic location of a third individual producer of the authorized producers.

18. The method of claim 15, wherein the first encryption key and the second encryption key allow the first subset and the second subset of the authenticated consumers to access the content provided by a third individual producer of the authorized producers.

19. The method of claim 18, further comprising:
maintaining a shared list among the authorized producers, the shared list including the authenticated consumers and revoked consumers.

20. The method of claim 19, further comprising:
generating, by the first individual producer, an updated first encryption key;

based at least in part on the shared list, determining a portion of the first subset of the authenticated consumers that remain unrevoked; and distributing the updated first encryption key to the unrevoked portion of the first subset of the authenticated consumers, the updated first encryption key allowing the unrevoked portion of the first subset to access the content provided by the third individual producer.

* * * * *